US011063646B2

United States Patent
Chang et al.

(10) Patent No.: US 11,063,646 B2
(45) Date of Patent: Jul. 13, 2021

(54) DEVICE AND METHOD FOR SYNCHRONOUS BEAM SWITCHING

(71) Applicant: Apple Inc., Cupertino, CA (US)

(72) Inventors: Wenting Chang, Beijing (CN); Yuan Zhu, Beijing (CN); Yushu Zhang, Beijing (CN); Gang Xiong, Beaverton, OR (US); Huaning Niu, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/780,477

(22) Filed: Feb. 3, 2020

(65) Prior Publication Data

US 2020/0177250 A1 Jun. 4, 2020

Related U.S. Application Data

(63) Continuation of application No. 16/079,805, filed as application No. PCT/US2016/039570 on Jun. 27, 2016, now Pat. No. 10,554,279.

(60) Provisional application No. 62/299,949, filed on Feb. 25, 2016.

(51) Int. Cl.
*H04B 7/06* (2006.01)
*H04B 7/08* (2006.01)

(52) U.S. Cl.
CPC ......... *H04B 7/0617* (2013.01); *H04B 7/0619* (2013.01); *H04B 7/0626* (2013.01); *H04B 7/08* (2013.01)

(58) Field of Classification Search
CPC .. H04B 7/0617; H04B 7/0619; H04B 7/0626; H04B 7/08

USPC .......................................................... 375/267
See application file for complete search history.

(56) References Cited

U.S. PATENT DOCUMENTS

| | | | |
|---|---|---|---|
| 2013/0155847 A1 | 6/2013 | Li et al. | |
| 2013/0315321 A1 | 11/2013 | Rajagopal et al. | |
| 2013/0343211 A1 | 12/2013 | Liu et al. | |
| 2014/0055302 A1 | 2/2014 | Jia | |
| 2016/0183234 A1* | 6/2016 | Sung | H04W 72/046 370/329 |

FOREIGN PATENT DOCUMENTS

| | | |
|---|---|---|
| TW | 201739192 | 11/2017 |
| WO | 2015109153 | 7/2015 |

OTHER PUBLICATIONS

"International Application Serial No. PCT/US2016/039570, International Search Report dated Nov. 18, 2016", 5 pgs.

(Continued)

*Primary Examiner* — Michael R Neff
(74) *Attorney, Agent, or Firm* — Kowert, Hood, Munyon, Rankin & Goetzel, P.C.

(57) ABSTRACT

Devices for and methods of synchronous beam refinement using a beam refinement reference signal (BRRS) are generally described. In one example embodiment, a UE receives BRRS information indicating switching of a Tx beam. The UE then uses this information to switch an associated Rx beam. In some embodiments, timing information is used to match the switching times. In some embodiments. DCI and CSI-RS operations are used to determine switching for the synchronous beam refinement.

20 Claims, 10 Drawing Sheets

(56) References Cited

OTHER PUBLICATIONS

"International Application Serial No. PCT/US2016/039570, Written Opinion dated Nov. 18, 2016", 12 pgs.
"International Application Serial No. PCT/US2016/039570, International Preliminary Report on Patentability dated Sep. 7, 2018", 12 pgs.

* cited by examiner

DEVICE AND METHOD FOR SYNCHRONOUS BEAM SWITCHING

PRIORITY CLAIM

This application is a continuation of U.S. patent application Ser. No. 16/079,805, filed Aug. 24, 2018, and entitled "DEVICE AND METHOD FOR SYNCHRONOUS BEAM SWITCHING," which is a United States National Stage filing under 35 U.S.C. 371 from International Application No. PCT/US2016/039570, filed Jun. 27, 2016, which claims the benefit of priority to U.S. Provisional Patent Application Ser. No. 62/299,949, filed Feb. 25, 2016, and entitled "SYNCHRONOUS BEAM SWITCHING," which are incorporated herein by reference in their entirety.

TECHNICAL FIELD

Embodiments pertain to radio access networks. Some embodiments relate to providing data in cellular and wireless local area network (WLAN) networks, including Third Generation Partnership Project Long Term Evolution (3GPP LTE) networks and LTE advanced (LTE-A) networks as well as $4^{th}$ generation (4G) networks and $5^{th}$ generation (5G) networks, all of which are hereinafter referred to as LTE networks. Some embodiments relate to beamforming in LTE networks.

BACKGROUND

The use of 3GPP LTE systems (including LTE and LTE-Advanced systems) has increased due to an increase in both the types of user equipment (UEs) using network resources and the amount of data and bandwidth being used by various applications, such as video streaming, operating on these UEs. As a result, 3GPP LTE systems continue to develop, with the next-generation wireless communication system, 5G, aiming to answer the ever-increasing demand for bandwidth.

In particular, carrier aggregation using high-frequency bands and Multiple Input Multiple Output (MIMO) systems is being used to increase data rates. MIMO systems use multipath signal propagation to communicate with one or more UEs via multiple signals transmitted by the same evolved NodeB (eNB) on the same or overlapping frequencies that would interfere with each other if they were on the same path. This increase in uplink or downlink data may be dedicated to one UE, increasing the effective bandwidth for that UE by the number of spatial streams (Single User MIMO or SU-MIMO), or may be spread across multiple UEs using different spatial streams for each UE (Multiple User MIMO or MU-MIMO). In beamforming of MU-MIMO systems, in which multiple signals are transmitted in parallel in different directions, selection of the appropriate beam may complicate transmission and reception, especially when the high-frequency bands are used.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
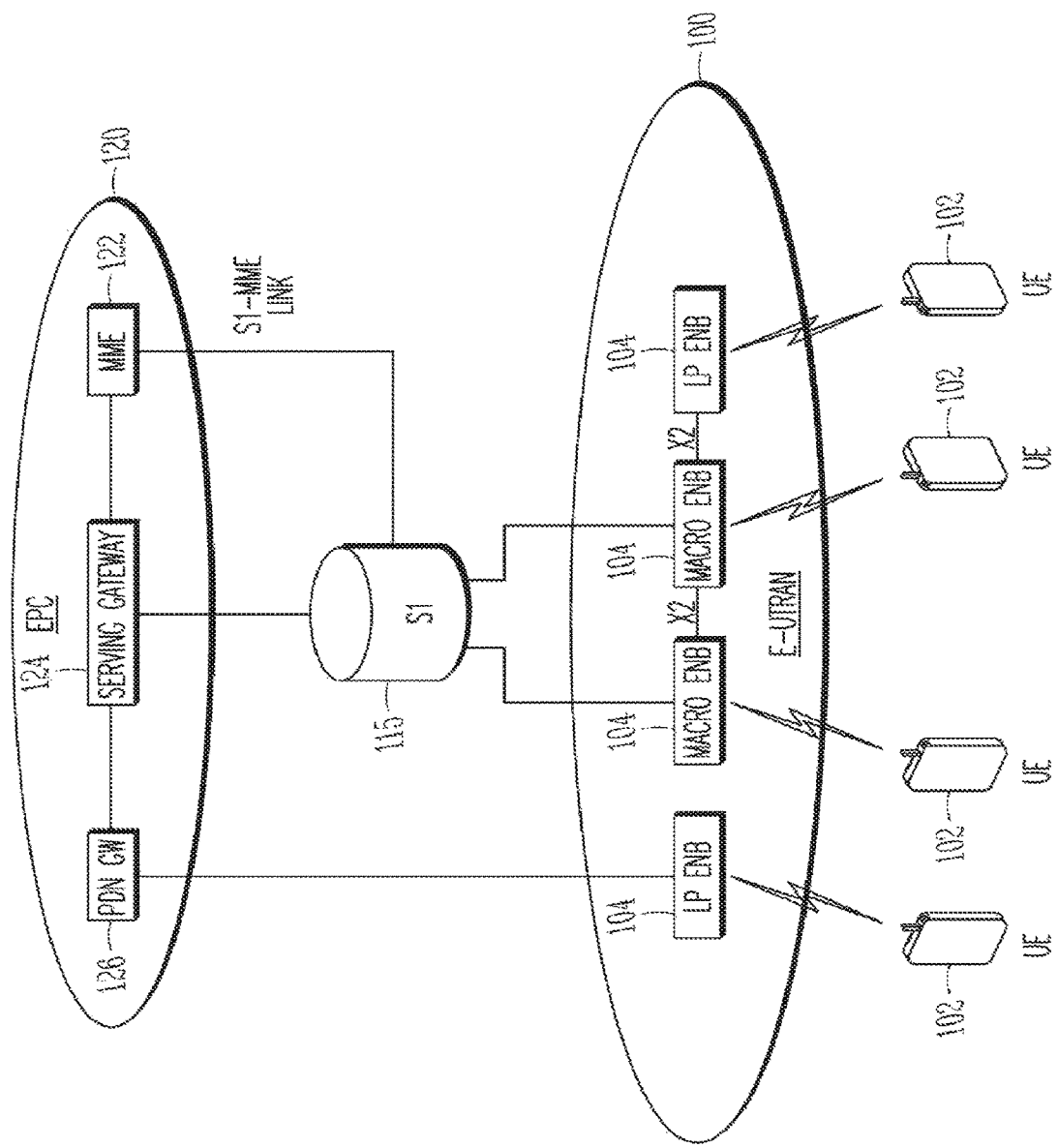
FIG. 1 is a functional diagram of a wireless network in accordance with some embodiments.

FIG. 1 shows an example of a portion of an end-to-end network architecture of a network (e.g. an Long Term Evolution (LTE) network) with various components of the network in accordance with some embodiments. In particular, some communications between eNBs 104 and UEs 102 may involve high-frequency channel communication with beamforming. In various embodiments, Beam Refinement Reference Signals (BRRSs) can be utilized as synchronization signals for transmit and receive beam switching, and beam switching indicators within downlink control information (DCI) communications. In various embodiments, these synchronous beam switching operations may be used in an LTE network such as the networks of FIGS. 1-3, or in any other such communication network. As used herein, an LTE network refers to both LTE and LTE Advanced (LTE-A) networks as well as other versions of LTE networks in development, such as 4G and 5G LTE networks. The network may comprise a radio access network (RAN) (e.g., as depicted, the E-UTRAN or evolved universal terrestrial radio access network) 100 and a core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, a serving gateway (serving GW) 124, and a packet data network gateway (PDN GW) 126. The RAN 101 may include evolved nodeBs (eNBs) 104 (which may operate as base stations) for communicating with user equipment (UE) 102. The eNBs 104 may include macro eNBs 104a and low power (LP) eNBs 104b. The eNBs 104 and UEs 102 may employ the techniques described herein.

The MME 122 may be similar in function to the control plane of legacy Serving GPRS Support Nodes (SGSN). The MME 122 may manage mobility aspects in access such as gateway selection and tracking area list management. The serving G % W 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes.

The PDN GW 126 may terminate a SGi interface toward the packet data network (PDN). The PDN GW 126 may route data packets between the core network 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller) functions such as radio bearer management, uplink and downlink dynamic radio resource management and data packet scheduling, and mobility management. In accordance with embodiments, the UEs 102 may be configured to communicate orthogonal frequency division multiplexed (OFDM) communication signals with an eNB 104 over a multicarrier communication channel in accordance with an orthogonal frequency-division multiple access (OFDMA) communication technique. The OFDM signals may comprise a plurality of orthogonal subcarriers.

The S1 interface 115 may be the interface that separates the RAN 101 and the core network 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP eNBs 104*b* may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104*b* might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, a LP eNB 104*b* may be implemented with a picocell eNB since it may be coupled to a macro eNB 104*a* via an X2 interface. Picocell eNBs or other LP eNBs 104*b* may incorporate some or all functionality of a macro eNB 104*a* or LP eNB 104*a*. In some cases, this may be referred to as an access point base station or enterprise femtocell.

Communication over an LTE network may be split up into 10 ms radio frames, each of which may contain ten 1 ms subframes. Each subframe of the frame, in turn, may contain two slots of 0.5 ms. Each subframe may be used for uplink (UL) communications from the UE 102 to the eNB 104 or downlink (DL) communications from the eNB 104 to the UE 102. In one embodiment, the eNB 104 may allocate a greater number of DL communications than UL communications in a particular frame. The eNB 104 may schedule transmissions over a variety of frequency bands. Each slot of the subframe may contain 6-7 OFDM symbols, depending on the system used. In one embodiment, each subframe may contain 12 subcarriers. In the 5G system, however, the frame size (ms), the subframe size, and the number of subframes within a frame, as well as the frame structure, may be different from those of a 4G or LTE system. The subframe size, as well as the number of subframes in a frame, may also vary in the 5G system from frame to frame. For example, while the frame size may remain at 10 ms in the 5G system for downward compatibility, the subframe size may be decreased to 0.2 ms or 0.25 ms to increase the number of subframes in each frame.

A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A RB in some embodiments may be 180 kHz wide in frequency and 1 slot long in time. In frequency, RBs may be either 12×15 kHz subcarriers or 24×7.5 kHz subcarriers wide, dependent on the system bandwidth. In Frequency Division Duplexing (FDD) systems, both the uplink and downlink frames may be 10 ms and frequency (full-duplex) or time (half-duplex) separated. The duration of the resource grid in the time domain corresponds to one subframe or two resource blocks. Each resource grid may comprise 12 (sub-carriers)*14 (symbols)=168 resource elements.

Each OFDM symbol may contain a cyclic prefix (CP) which may be used to effectively eliminate Inter Symbol Interference (ISI), and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

There may be several different 5G physical downlink channels that are conveyed using such resource blocks, including the 5G physical downlink control channel (xPDCCH) and the 5G physical downlink shared channel (xPDSCH). Each downlink subframe may be partitioned into the xPDCCH and the xPDSCH, and perhaps additional signals, as discussed below. The xPDCCH may occupy the first two symbols of each subframe and carry, among other information, information about the transport format and resource allocations related to the xPDSCH channel, as well as allocation and hybrid automatic repeat request (H-ARQ) information related to the 5G uplink shared channel (xPUSCH). The xPDSCH may carry user data and higher-layer signaling to a UE and, in some embodiments, occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the xPDCCH used for (assigned to) the UE. The xPDCCH may contain DCI in one of a number of formats that indicate to the UE how to find and decode data, transmitted on the xPDSCH in the same subframe, from the resource grid. The DCI format may provide details such as a number of resource blocks, resource allocation type, modulation scheme, transport block, redundancy version, coding rate, etc. Each DCI format may have a cyclic redundancy code (CRC) and be scrambled with a Radio Network Temporary Identifier (RNTI) that identifies the target UE for which the xPDSCH is intended. Use of the UE-specific RNTI may limit decoding of the DCI format (and hence the corresponding xPDSCH) to only the intended UE.

Various types of reference signals may be transmitted by the eNB 104 for a UE 102 to measure. The reference signals may include, for example, cell-specific reference signals (CRSs) and UE-specific reference signals (DMRSs). The CRSs may be used for cell search and initial acquisition, demodulation, and channel quality estimation. The DMRSs may be used for PDSCH demodulation by the UE, as well as for handover. The number and type of downlink reference signals has increased with newer generations of LTE networks, which has led to issues due to the increased number of antennas, antenna panels, and antenna ports. In particular, the eNB and/or UE may use specific reference signals in beamforming to increase data throughput or quality. Different reference signals may be transmitted by the eNB in each beam for power measurement by the UEs serviced by the eNB and beam selection. These reference signals may be referred to as Beamformed Reference Signals (BRSs) and may be located in different symbols within a specific BRS subframe. The eNB may transmit different beamformed reference signals in the PDSCH on the different antennas. In particular, the different beamformed reference signal may use different sequences to enable the UE to distinguish among the various beamformed reference signals. The sequences may be similar to those used for so Secondary Synchronization Signal (SSS) sequences, which may be an interleaved concatenation of two length-31 binary sequences scrambled with a scrambling sequence given by the Primary Synchronization Signal (PSS). In some embodiments, the BRS transmitted from each eNB antenna port may be a cyclic shift of a base sequence. In some embodiments, the UE may perform a scan to determine which BRS to use in order to measure the BRS receive power (BRS-RP). In some embodiments, the UE will subsequently transmit BRS-RP information as well as identity information of the beam and UE. This information, for example, may enable the eNB to determine the best direction for transmitting data to the UE.

In some embodiments, Channel State Information (CSI) measurements may be used to estimate the channel quality. CSI measurements may measure CRSs, CSI Reference Signals (CSI-RSs), or other Channel State Information-Interference Measurement (CSI-IM) signals transmitted by the eNB. From the measurements, calculations of the channel quality may be subsequently determined and reported to the eNB. The CSI report may include a Channel Quality Indicator (CQI) and may be sent from the UE to the eNB to indicate a suitable downlink transmission data rate. i.e., a Modulation and Coding Scheme (MCS) value, for communications with the UE. The information provided by the CQI may include both channel quality and desired transport block size.

The system shown in FIG. 1 may also support MU-MIMO and massive MIMO. Massive MIMO may use hundreds or thousands of antennas over multiple terminals and eNBs, each of which may be equipped with arrays of active antenna elements. Signals sent using a set of antennas at a particular angle are referred to as a beam. Each beam may have one or more transmission angles, as well as an angular volume or a set of allowable ranges for the transmission angles. For example, a beam may be associated with a horizontal angle, which allows the antennas on an eNB to track a UE as it moves across a coverage area horizontally, and with a vertical angle that changes as a height of the UE or a distance of the UE from the eNB changes. For a fixed set of antennas that generate the beam, this range will be limited, and the UE is passed to different beams or channels when the UE moves outside the area of coverage for a particular beam.

An eNB can schedule a best transmission beam and a surrounding transmission beam within a CSI process. The Antenna Ports (APs) (e.g., the fixed address ports for each antenna out of all of the antennas of the eNB) transmitting the best beam for a CSI-RS group may be explicitly configured via radio resource control (RRC) signaling. The CSI processes thus measure the performance of channels on particular beams using the beamformed reference signals transmitted by those beams. RRC signaling may be used to select multiple beams for transmission of data from the eNB to the UE when quality thresholds are within certain parameters. Different structures for the CSI processes may be used. For example, in some embodiments, each beam may have separate CSI processes, and the eNB may configure a transmission beam index for each CSI-RS group in a CSI process by RRC signaling. The UE may provide to the eNB CSI or CQI feedback for at least some of the beams provided by the eNB. In some embodiments, each of the beams is configured as a CSI-RS. Each beam may have a different polarization, leading to a number of MIMO layers being used for each beam.

In MU-MIMO or massive MIMO, Tx beamforming and Rx beamforming may be applied simultaneously. BRRSs may be used for beam refinement. In at least one case, to support a repeated BRRS, a wider subcarrier spacing or time domain replica waveform may be used. The BRRS can be generated within one OFDM symbol, using frequency domain down-sampling which changes the sampling band edge and scales the amplitude of the sampled signal. By the down-sampling, the number of time-domain samples can be reduced so that the subcarrier spacing can be increased. The BRRS may be generated using a Zadoff-Chu sequence. The sequence may be a function of the slot number, the cyclic shift, the virtual cell ID, the number of antenna ports, an antenna-port-to-cyclic-shift mapping function where the cyclic shift is determined by a hash table, and the number of BRRS subcarriers. The sequence may be mapped to resource elements on antenna ports as a function of the number of BRRS sequence replicas in one symbol, the total number of downlink resource blocks, and the subcarrier number per resource block. The BRRS can be mapped to multiple BRRS symbols with repeated pattern and sequence, where the number of BRRS symbols may be defined by the system or indicated by the DCI and may be transmitted in one or more OFDM symbols.

Figure 2:
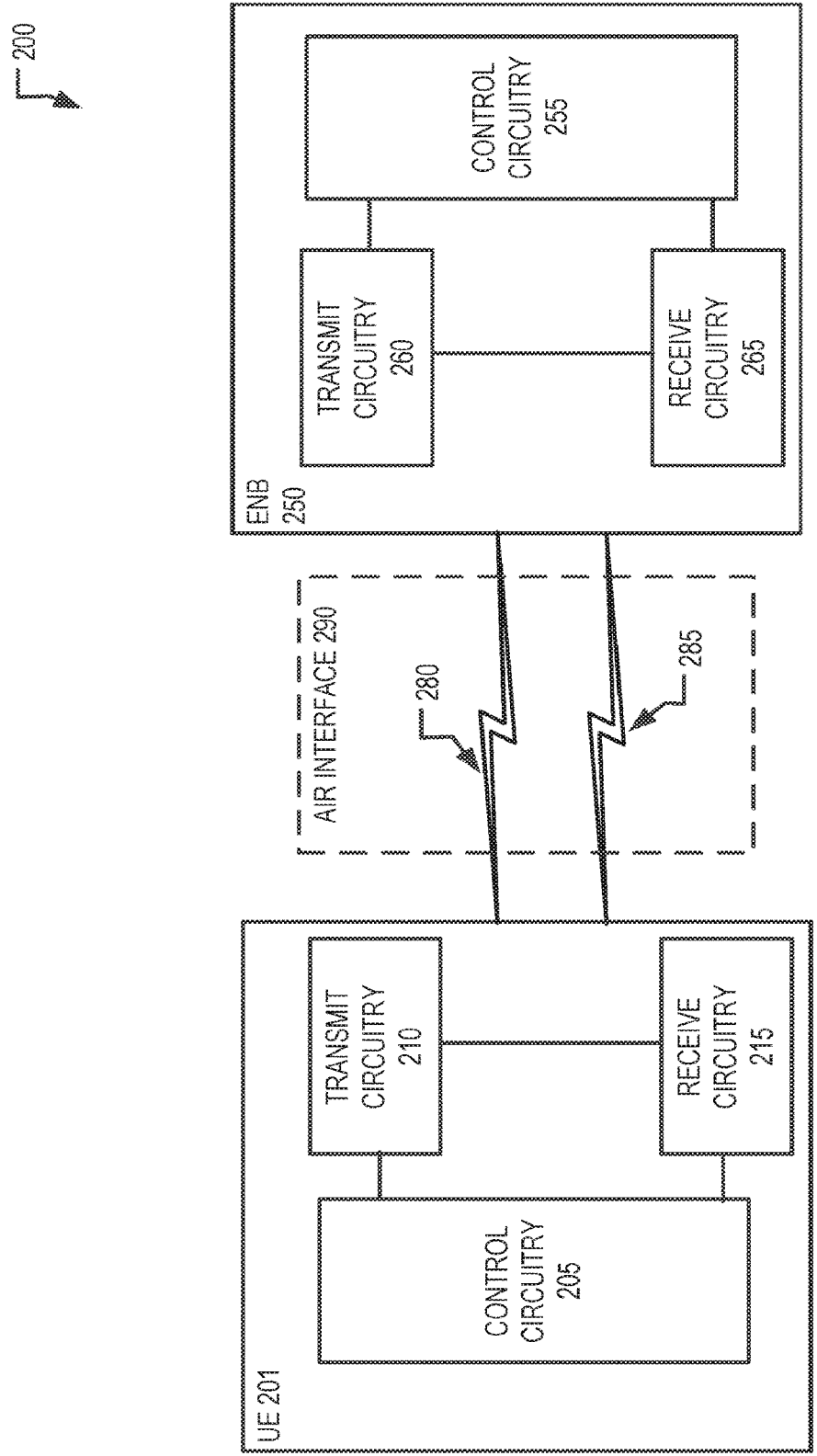
FIG. 2 illustrates components of a communication network in accordance with some embodiments.

FIG. 2 illustrates a wireless network 200, in accordance with some embodiments. The wireless network 200 includes a UE 201 and an eNB 250 connected via one or more channels 280, 285 across an air interface 290. The UE 201 and eNB 250 communicate using a system that supports controls for managing the access of the UE 201 to a network via the eNB 250.

In the wireless network 200, the UE 201 and any other UE in the system may be, for example, laptop computers, smartphones, tablet computers, printers, machine-type devices such as smart meters or specialized devices for healthcare monitoring, remote security surveillance systems, intelligent transportation systems, or any other wireless devices with or without a user interface. The eNB 250 provides the UE 201 network connectivity to a broader network (not shown). This UE 201 connectivity is provided via the air interface 290 in an eNB service area provided by the eNB 250. In some embodiments, such a broader network may be a wide area network operated by a cellular network provider, or may be the Internet. Each eNB service area associated with the eNB 250 is supported by antennas integrated with the eNB 250. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the eNB 250, for example, includes three sectors each covering an approximately 120 degree area with an array of antennas directed to each sector to provide 360 degree coverage around the eNB 250.

The UE 201 includes control circuitry 205 coupled with transmit circuitry 210 and receive circuitry 215. The transmit circuitry 210 and receive circuitry 215 may each be coupled with one or more antennas. The control circuitry 205 may be adapted to perform operations associated with wireless communications using congestion control. The control circuitry 205 may include various combinations of application specific circuitry and baseband circuitry. The transmit circuitry 210 and receive circuitry 215 may be adapted to transmit and receive data, respectively, and may include radio frequency (RF) circuitry or front end module (FEM) circuitry. In various embodiments, aspects of the transmit circuitry 210, receive circuitry 215, and control circuitry 205 may be integrated in various ways to implement the circuitry described herein. The control circuitry 205 may be adapted or configured to perform various operations such as those described elsewhere in this disclosure related to a UE. The transmit circuitry 210 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 210 may be configured to receive block data from the control circuitry 205 for transmission across the air interface 290. Similarly, the receive circuitry 215 may receive a plurality of multiplexed downlink physical channels from the air interface 290 and relay the physical channels to the control circuitry 205. The plurality of downlink physical channels may be multiplexed according to TDM or FDM along with carrier aggregation. The transmit circuitry 210 and the receive circuitry 215 may transmit and receive both control data and content data (e.g., messages, images, video, etc.) structured within data blocks that are carried by the physical channels.

FIG. 2 also illustrates the eNB 250, in accordance with various embodiments. The eNB 250 circuitry may include control circuitry 255 coupled with transmit circuitry 260 and receive circuitry 265. The transmit circuitry 260 and receive circuitry 265 may each be coupled with one or more antennas that may be used to enable communications via the air interface 290.

The control circuitry 255 may be adapted to perform operations for managing channels and congestion control communications used with various UEs, including communication of open mobile alliance (OMA) management objects (OMA-MOs) describing application categories as detailed further below. The transmit circuitry 260 and receive circuitry 265 may be adapted to transmit and receive data, respectively, to any UE connected to the eNB 250. The transmit circuitry 260 may transmit downlink physical channels comprised of a plurality of downlink subframes. The receive circuitry 265 may receive a plurality of uplink physical channels from various UEs including the UE 201.

Figure 3:
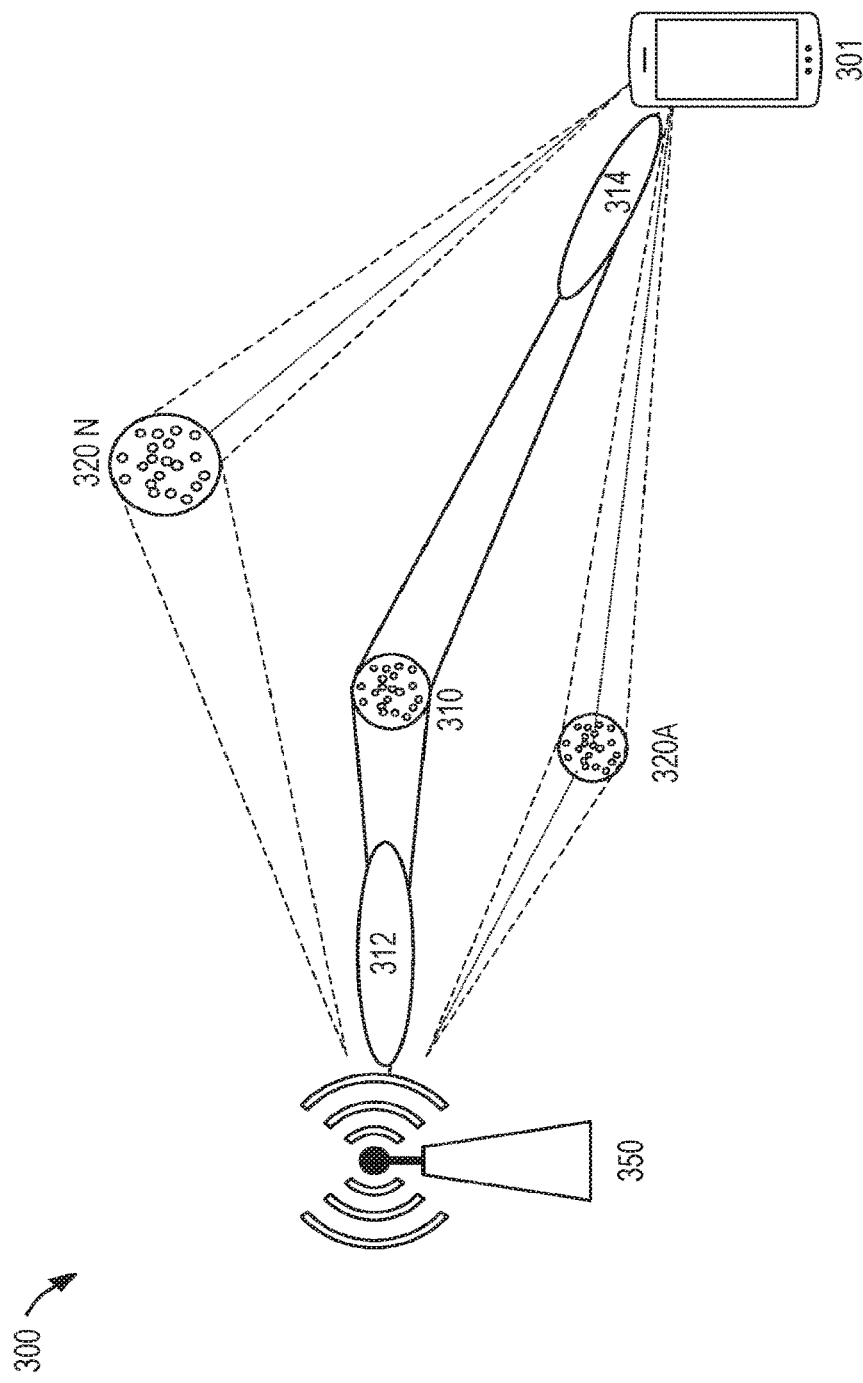
FIG. 3 illustrates aspects of a beamforming MU-MIMO system in accordance with some embodiments.

FIG. 3 illustrates aspects of a wireless system 300 in accordance with some embodiments. The wireless system 300 includes high-frequency band communications between an eNB 350 and a UE 301. In the high-frequency band communications, beamforming for a transmit (Tx) beam 312 and a receive (Rx) beam 314 is applied to provide beamforming gain. In various embodiments, this compensates for severe path loss, and suppresses mutual user interference.

During the wireless link between the eNB 350 and the UE 301, multiple channel clusters 320A-N exist due to reflection and/or diffraction. At the eNB 350 side, the Tx beam 312 aligns with the angle of departure (AOD) and zenith angle of departure (ZOD) of a strongest channel cluster 310. Similarly, at the UE 301 side, the Rx beam 314 will align with the angle of arrival (AOA) and zenith angle of arrival (ZOA) of the strongest channel cluster 310 selected from all channel clusters 320A-N. While FIG. 3 illustrates the AOA/ZOA and AOD/ZOD with a two-dimensional representation associated with the illustrated directionality of the Tx beam 312 and the Rx beam 314, it will be apparent that the AOA/ZOA and AOD/ZOD are associated with a three-dimensional direction for both the Tx beam 312 and the Rx beam 314, and any adjustment in a beam to generate an updated Tx beam or updated Rx beam may be performed for alignment in a three-dimensional space to generate the communication link between the eNB 350 and the UE 301. Along with the movement of the UE 301 or the change of the surrounding environment the strongest channel cluster will change from the strongest channel cluster 310 to a new strongest channel cluster. Subsequently, the Tx/Rx beam pair 312, 314 may adjust to a new updated Tx/Rx beam pair to match the new strongest channel cluster selected from the channel clusters 320A-N. In various embodiments, this serves to realize transmission based on the strongest channel cluster as it changes.

Figure 4:
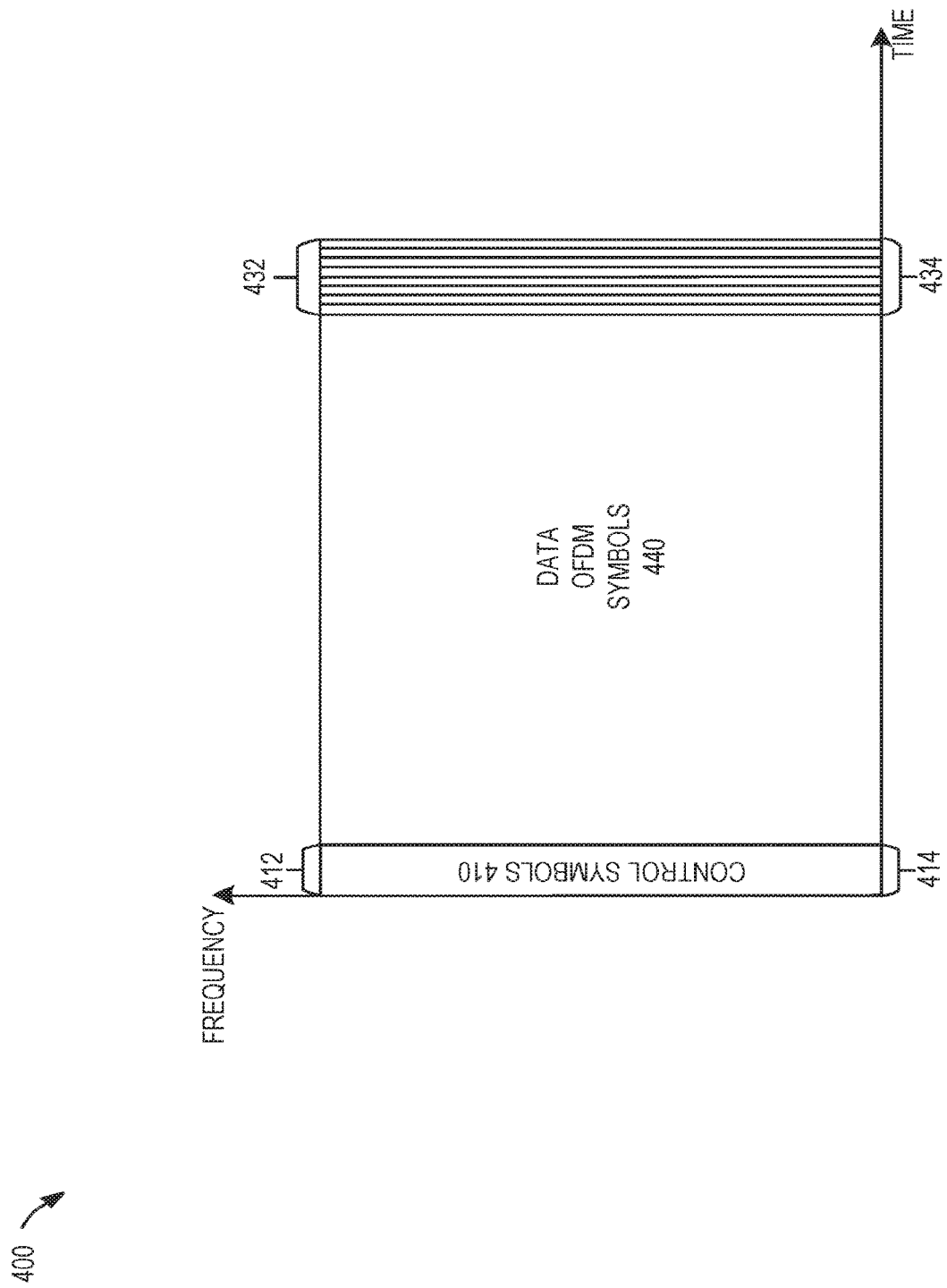
FIG. 4 illustrates aspects of synchronous beam switching in accordance with some embodiments.

In particular, during beam switching, the link quality will decrease if the Tx beam 312 and Rx beam 314 are mismatched as the adjustment occurs during alignment to a different channel cluster. As described herein, signaling is used to limit the mismatch during switching. FIG. 4 illustrates aspects of synchronous beam switching in accordance with some embodiments. As illustrated by communications 400 of FIG. 4, in some embodiments, control symbols 410 include a beam switching indicator for synchronous beam switching. In some embodiments, the control symbols 410 include DCI. In some such embodiments, the beam switching indicator is a 1-bit element within the control symbols 410. The control symbols 410 are communicated using a Tx beam 412 and an Rx beam 414. In response to the beam switching indicator, at a later time following communication of the control symbols 410, data OFDM symbols 440 are communicated using an updated Tx beam 432 and an updated Rx beam 434.

Figure 5:
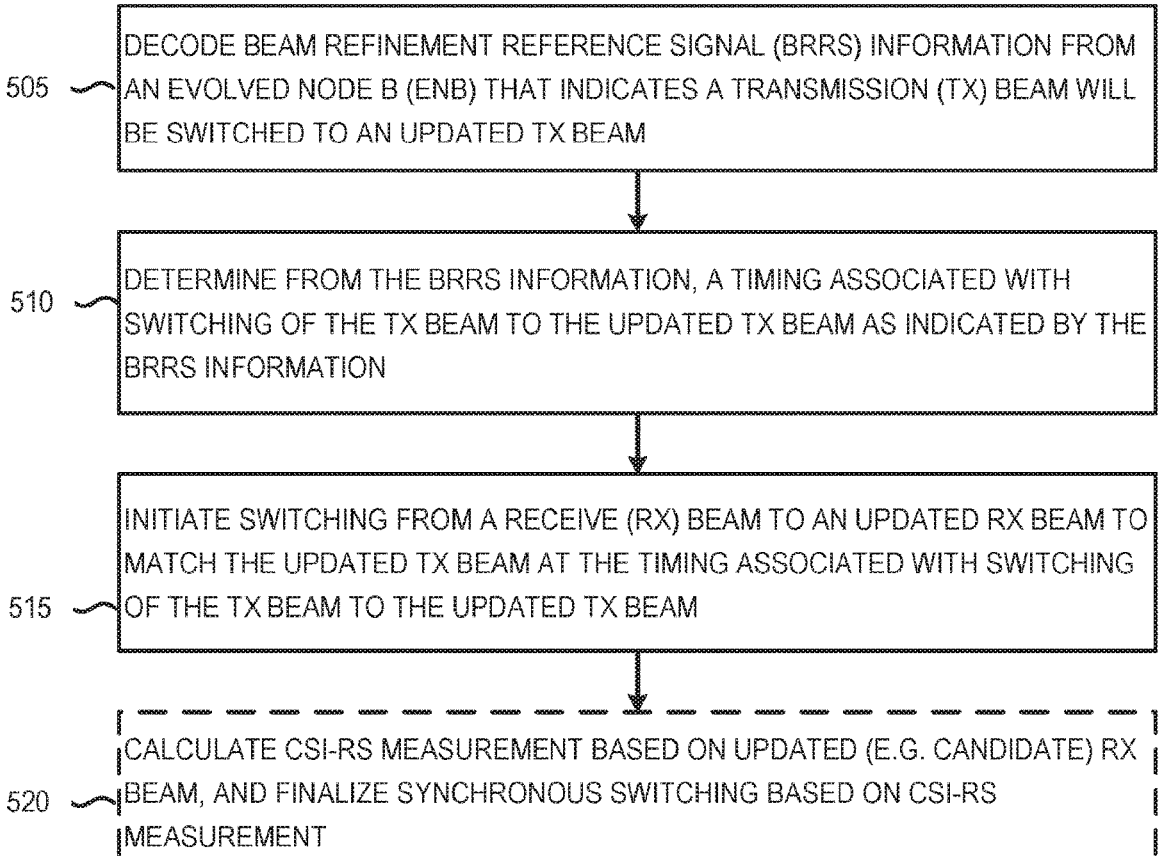
FIG. 5 illustrates an example method for synchronous beam switching in accordance with some embodiments.

FIG. 5 illustrates an example method 500 for synchronous beam switching in accordance with some such embodiments. Method 500 is performed by a UE in a wireless network in some embodiments. In some embodiments, method 500 is embodied by circuitry configured or adapted to perform the operations of method 500 as part of a device. In some embodiments, instructions on a storage medium or a non-transitory computer readable medium that, when executed by one or more processors, cause a device (e.g., UE) to perform method 500 are an embodiment.

Method 500 begins with operation 505, in which a UE decodes beam refinement reference signal (BRRS) information (e.g., control symbols 410) from an evolved node B (eNB) that indicates that a transmission (Tx) beam (e.g., Tx beam 412) will be switched to an updated Tx beam (e.g., updated Tx beam 432).

In operation 510, the UE determines, from the BRRS information, a timing associated with the switching of the Tx beam to the updated Tx beam. This timing enables synchronous operation, and limits performance degradation caused by mismatch between the Tx and Rx beams as they change over time, as detailed above. In some embodiments, the timing information is based on an Nth frame offset value from the communication comprising the BRRS information (e.g., a frame including DCI). In other embodiments, other such timings may be used. In some embodiments, an immediate switching is performed as the BRRS information is decoded and the UE determines that the Tx beam is switching to an updated Tx beam. The UE initiates switching from a current Rx beam to an updated Rx beam in operation 515 to match the updated Tx beam at the timing associated with the switching of the Tx beam to the updated Tx beam.

In some embodiments, prior to the UE receiving data on an updated Rx beam, operation 520 is performed, in which CSI-RS operation is enabled, and performance measurements are calculated using the updated Rx beam. Additional details of such an operation are described below with respect to FIG. 7.

Figure 6:
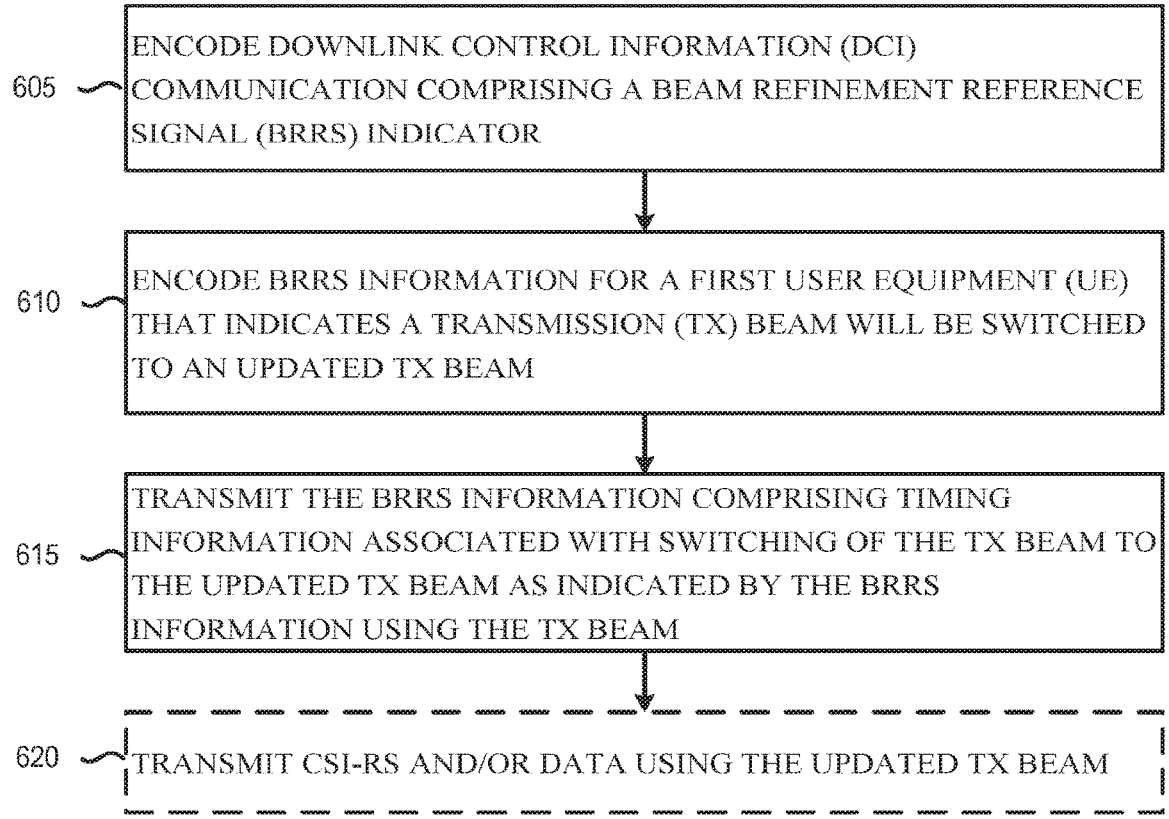
FIG. 6 illustrates one example method of synchronous beam switching in accordance with some embodiments.

FIG. 6 illustrates an example method of synchronous beam switching in accordance with some embodiments. FIG. 6 illustrates a corresponding method 600 performed by an eNB that may be in communication with a UE performing method 500. Method 600 is implemented similarly to method 500 in different embodiments, as described above. In other embodiments, method 600 is performed by an eNB in communication with multiple UEs, or in communication with one or more UEs performing operations different from those of method 500.

In method 600, an eNB such as eNB 104, 250, or 350 encodes a DCI communication comprising a BRRS indicator in operation 605. This BRRS information is encoded for a first UE to indicate that a Tx beam will be switched to an updated Tx beam in operation 610. In operation 615, the eNB transmits the encoded DCI including the BRRS information to the first UE. In operation 620, the eNB then transmits information using the updated Tx beam. In some embodiments, CSI-RS operation is enabled, such that a reference signal is transmitted using the updated Tx beam prior to transmitting data on the updated Tx beam. In other embodiments, data is simply transmitted on the updated Tx beam at a time indicated by timing information of the DCI.

For example, as described above with respect to operation 520, the beam switching indicator can be configured during DCI for CSI-RS configuration. In such embodiments, if beam switching is activated, a UE will measure the CSI-RS based on a candidate Rx beam; otherwise, the current Rx beam is adopted.

In some such embodiments, for example, the control symbols 410 include configuration for a beam switching indicator. If beam switching is activated, CSI-RS measurements are performed based on transmissions by the updated Tx beam using an updated Rx beam. If the performance of the updated (e.g., candidate) Rx beam is superior to the previously used Rx beam, then the updated Rx beam is used for data transmissions. If the performance of the previously used Rx beam is superior, the data transmissions occur using the updated Tx beam and the previous Rx beam (e.g., the Rx beam instead of the updated/candidate Rx beam).

Figure 7:
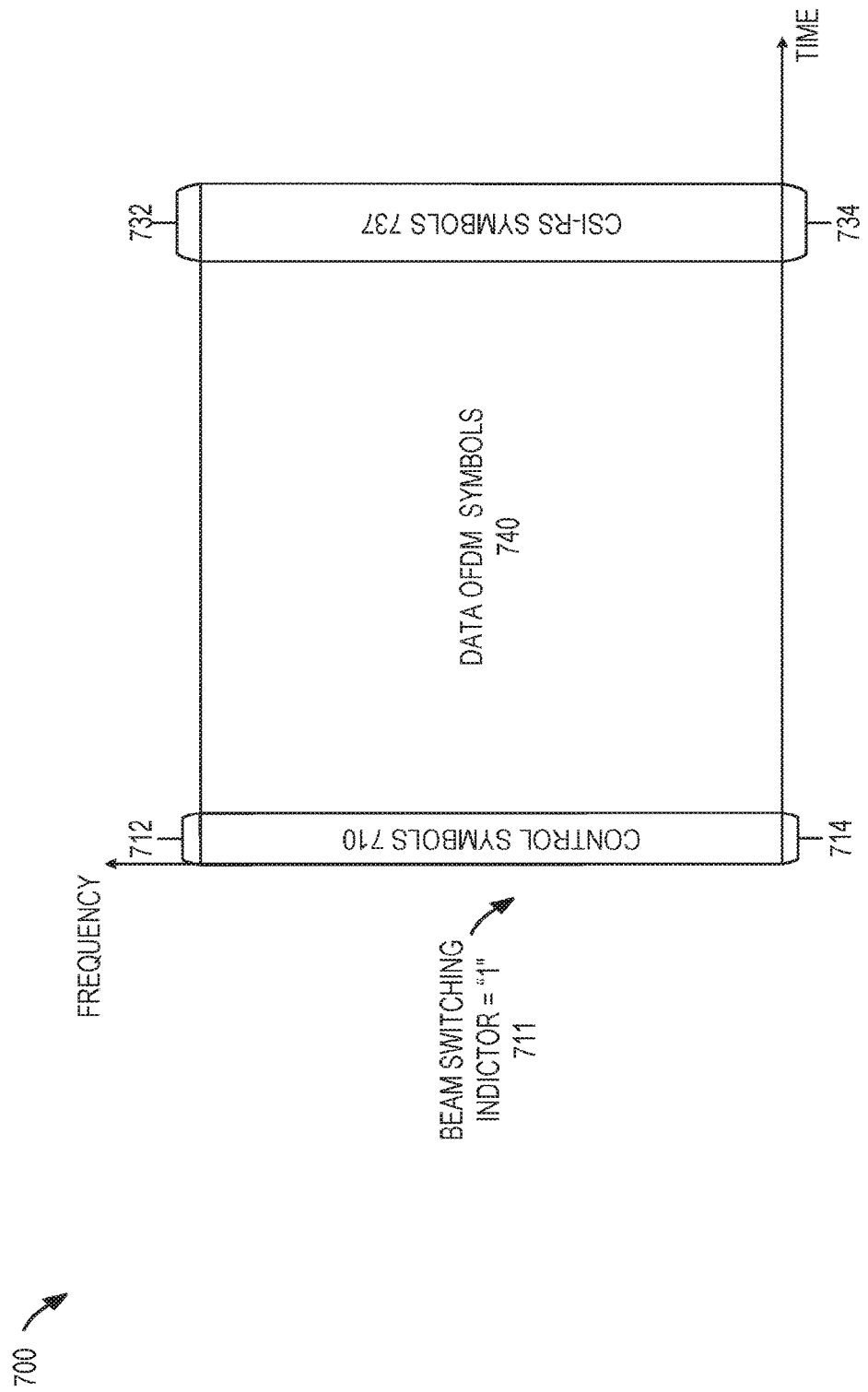
FIG. 7 illustrates aspects of synchronous beam switching in accordance with some embodiments.

FIG. 7 illustrates aspects of synchronous beam switching in accordance with some embodiments that use CSI-RS and a one-hit beam switching indicator. FIG. 7 illustrates communications 700 between an eNB and a UE using Tx and Rx beams that switch over time along with the movement of the UE or changes in the surrounding environment, as described above and illustrated by the channel clustering in FIG. 3. During initial operation, a strongest cluster is selected and used to create a communication link with a Tx beam 712 and an Rx beam 714. The cluster is selected so that a qualified link can be built, since the stronger channel clusters provide better channel quality. As the environment changes, and the power of different clusters fluctuates, the eNB and UE update the Tx beam and Rx beam using synchronous switching. As part of this, the initial Tx beam 712 and Rx beam 714 communicate control symbols 710 including a one-bit beam switching indicator 711 with a value of "1", indicating abrupt beam switching. In such an embodiment, the BRRS is utilized as an indication signal.

In one embodiment, if the eNB is configured to change such that a current Rx beam will be switched to an updated candidate Rx beam when the channel quality indicator (CQI) of the updated candidate Rx beam is better than the current Rx beam, the BRRS format for abrupt beam switching is triggered.

In such an embodiment, the UE receives the DCI corresponding to a BRRS configuration based on the current Rx beam 714, and detects the BRRS format indicator within the DCI. After the UE observes that the BRRS format indicator identifies a format for abrupt beam switching, the UE calculates an optimal Rx beam for the following data reception. In some embodiments, the UE receives the BRRS based on the current Rx beam 714 and identifies a set of candidate Rx beams around a target candidate Rx beam. The final (e.g., optimal or calculated best) Rx beam is determined and used for the subsequent data communication.

As illustrated by FIG. 7, in one embodiment, the control symbols 710 include the beam switching indicator 711 communicating to a UE that an abrupt beam switching is triggered. The control symbols 710 are communicated using the current Tx beam 712 and Rx beam 714. CSI-RS symbols 737 are also communicated and received using an updated Tx beam 732 and a candidate updated Rx beam 734. Transmission of data OFDM symbols 740 may continue during the time before the switching occurs. The UE then calculates CQI information or other related signal quality information to determine an updated Rx beam with the highest performance. This may be the candidate updated Rx beam 734, the original Rx beam 714, or another Rx beam that is part of a set of candidate Rx beams having any AOD/ZOD value. Once the updated Rx beam is selected (e.g., a beam having determined AOD/ZOD values), the data is received using the updated Rx beam.

As described in various embodiments below, in order to simultaneously switch the Tx beam 312 and the Rx beam 314 at the corresponding eNB 350 and UE 301 (FIG. 3), the following mechanisms are proposed in this disclosure: BRRS can be utilized as the synchronous signal to inform the UE 301 that it is a candidate for beam switching; and a beam switching indicator within DCI may be used.

In the embodiment of FIG. 7, the example one-bit beam switching indicator format element has a value of one. In other embodiments, the beam switching indicator format element has a value of zero, and operation continues with no adjustments. In other embodiments, the operations associated with "O" and "1" values may be reversed, such that a "0" value is associated with the abrupt beam switching.

In various other embodiments, any other such DCI format element values or other DCI are used with a beam switching indicator as described herein. Additionally, as described above, in any embodiments, control symbols (e.g., DCI) include timing information. Such timing information may include a network synchronized time for switching both the Tx and Rx beams. In some embodiments, the timing information is based on a subframe offset (e.g., Noffset) for beam switching that is configured by DCI. In still further embodiments, master information block (MIB), system information block (SIB), or radio resource control (RRC) signaling may be used to identify the timing information, such that the Tx and Rx beams are operated with synchronous switching to minimize performance degradation when the Tx and Rx beams are mismatched.

EXAMPLE EMBODIMENTS

Example 1 is an apparatus of a user equipment (UE), the apparatus comprising: a memory; and processing circuitry in communication with the memory and arranged to: decode beam refinement reference signal (BRRS) information from an evolved node B (eNB) that indicates that a transmission (Tx) beam is to switch to an updated Tx beam; and initiate switching from a receive (Rx) beam to an updated Rx beam to match the updated Tx beam when switching the Tx beam to the updated Tx beam.

In Example 2, the subject matter of Example 1 optionally includes wherein the processing circuitry is further configured to: receive, from the eNB, a downlink control information (DCI) using the Rx beam, wherein the DCI communication is received prior to decoding the BRRS information.

In Example 3, the subject matter of Example 2 optionally includes wherein the processing circuitry is further configured to decode a BRRS format indicator within the DCI.

In Example 4, the subject matter of Example 3 optionally includes wherein the processing circuitry is further configured to: identify the BRRS format indicator as an abrupt beam switching indicator; and determine the updated Rx beam.

In Example 5, the subject matter of any one or more of Examples 1-4 optionally include—4 wherein the processing circuitry is further configured to select the updated Rx beam from a set of candidate Rx beams.

In Example 6, the subject matter of Example 5 optionally includes wherein the updated Rx beam is selected from the set of candidate Rx beams following receipt of the BRRS information.

In Example 7, the subject matter of any one or more of Examples 5-6 optionally include wherein the BRRS information is received using the updated Rx beam.

In Example 8, the subject matter of any one or more of Examples 2-7 optionally include or 7 wherein the processing circuitry is further arranged to: configure a beam switching indicator with receipt of the DCI for channel status indicator reference signal (CSI-RS) operation.

In Example 9, the subject matter of Example 8 optionally includes wherein the processing circuitry is further arranged to: following identification of the BRRS format indicator as an abrupt beam switching indicator, performing a CSI-RS measurement on the updated Rx beam.

In Example 10, the subject matter of Example 9 optionally includes wherein the processing circuitry is further arranged to receive a data transmission associated with the updated Tx beam using the updated Rx beam in response to the CSI-RS measurement.

In Example 11, the subject matter of any one or more of Examples 9-10 optionally include wherein the processing circuitry is further arranged to: cancel switching from the Rx beam to the updated Rx beam in response to the CSI-RS measurement: and receive a transmission associated with the updated Tx beam using the Rx beam in response to the CSI-RS measurement.

In Example 12, the subject matter of any one or more of Examples 4-11 optionally include or 8, wherein the beam switching indicator comprises a 1-bit field within a DCI format associated with the DCI.

In Example 13, the subject matter of Example 12 optionally includes, wherein the abrupt beam switching indicator is configured by the UE in response to a downlink configuration DCI.

In Example 14, the subject matter of any one or more of Examples 12-13 optionally include wherein the abrupt beam switching indicator is configured by a second DCI separate from the DCI.

In Example 15, the subject matter of any one or more of Examples 10-14 optionally include further comprising: one or more antennas coupled to the processing circuitry: and a touchscreen display: wherein the BRRS information is received via the one or more antennas: and wherein the data transmission is initiated in response to an input received at the touchscreen display.

Example 16 is a computer-readable storage medium that stores instructions for execution by one or more processors of a user equipment (UE), the one or more processors to configure the UE to: decode beam refinement reference signal (BRRS) information from an evolved node B (eNB) that indicates that a transmission (Tx) beam is to switch to an updated Tx beam; determine, from the BRRS information, a timing associated with switching of the Tx beam to the updated Tx beam as indicated by the BRRS information; and initiate switching from a receiver (Rx) beam to an updated Rx beam to match the updated Tx beam at the timing associated with the switching of the Tx beam to the updated Tx beam.

In Example 17, the subject matter of Example 16 optionally includes wherein the timing associated with the switching of the Tx beam to the updated Tx beam as indicated by the BRRS information comprises an Nth frame offset value.

In Example 18, the subject matter of Example 17 optionally includes wherein the processors are further configured to initiate the switching to the updated Rx beam upon receiving the BRRS information when the Nth frame offset value is 0.

In Example 19, the subject matter of any one or more of Examples 16-18 optionally include wherein the processors are further configured to: receive, from the eNB, a downlink control information (DCI) communication using the Rx beam prior to decoding the BRRS information; decode a BRRS format indicator within the DCI; identify the BRRS format indicator as an abrupt beam switching indicator; and configure a beam switching indicator with receipt of the DCI for channel status indicator reference signal (CSI-RS) operation.

In Example 20, the subject matter of Example 19 optionally includes, wherein the beam switching indicator comprises a 1-bit field within a DCI format associated with the DCI.

In Example 21, the subject matter of Example 20 optionally includes, wherein the beam switching indicator is configured by the UE during an uplink grant DCI.

Example 22 is an apparatus of an evolved node B (eNB), the apparatus comprising: a memory; and processing circuitry in communication with the memory and arranged to: encode a downlink control information (DCI) communication comprising a beam refinement reference signal (BRRS) format indicator; and encode BRRS information for a first user equipment (UE) that indicates that a transmission (Tx) beam is to switch to an updated Tx beam; wherein the BRRS information comprises timing information associated with switching of the Tx beam to the updated Tx beam as indicated by the BRRS information.

In Example 23, the subject matter of Example 22 optionally includes wherein the BRRS format indicator is an abrupt beam switching indicator; and wherein the eNB uses the DCI for channel status indicator reference signal (CSI-RS) operation.

In Example 24, the subject matter of Example 23 optionally includes wherein the timing information associated with the switching of the Tx beam to the updated Tx beam as indicated by the BRRS information comprises an Nth frame offset value.

In Example 25, the subject matter of Example 24 optionally includes wherein the processing circuitry is configured to initiate the switching to the updated Tx beam upon receiving the BRRS information when the Nth frame offset value is 0.

Example 26 is a method comprising: decoding beam refinement reference signal (BRRS) information from an evolved node B (eNB) that indicates that a transmission (Tx) beam is to switch to an updated Tx beam; determining, from the BRRS information, a timing associated with switching of the Tx beam to the updated Tx beam as indicated by the BRRS information; and initiating switching from a receiver (Rx) beam to an updated Rx beam to match the updated Tx beam at the timing associated with the switching of the Tx beam to the updated Tx beam.

In Example 27, the subject matter of Example 26 optionally includes wherein the timing associated with the switching of the Tx beam to the updated Tx beam as indicated by the BRRS information comprises an Nth frame offset value.

In Example 28, the subject matter of Example 27 optionally includes wherein the processors are further configured to initiate the switching to the updated Rx beam upon receiving the BRRS information when the Nth frame offset value is 0.

In Example 29, the subject matter of any one or more of Examples 26-28 optionally include wherein the processors are further configured to: receive, from the eNB, a downlink control information (DCI) communication using the Rx beam prior to decoding the BRRS information; decode a BRRS format indicator within the DCI; identify the BRRS format indicator as an abrupt beam switching indicator; and configure a beam switching indicator with receipt of the DCI for channel status indicator reference signal (CSI-RS) operation.

In Example 30, the subject matter of Example 29 optionally includes, wherein the beam switching indicator comprises a 1-bit field within a DCI format associated with the DCI.

In Example 31, the subject matter of Example 30 optionally includes, wherein the beam switching indicator is configured by the UE during an uplink grant DCI.

Example 32 is an apparatus of a user equipment (UE), the apparatus comprising: a memory: and means for decoding beam refinement reference signal (BRRS) information from an evolved node B (eNB) that indicates that a transmission (Tx) beam is to switch to an updated Tx beam; and means for initiating switching from a receive (Rx) beam to an updated Rx beam to match the updated Tx beam when switching the Tx beam to the updated Tx beam.

In Example 33, the subject matter of Example 32 optionally includes further comprising: means for receiving, from the eNB, a downlink control information (DCI) using the Rx beam, wherein the DCI communication is received prior to decoding the BRRS information.

In Example 34, the subject matter of any one or more of Examples 32-33 optionally include further comprising means for decoding a BRRS format indicator within the DCI.

In Example 35, the subject matter of any one or more of Examples 32-34 optionally include further comprising: means for configuring a beam switching indicator with receipt of the DCI for channel status indicator reference signal (CSI-RS) operation.

Example 36 is a method comprising: transmitting an indicator by a transmitter, the indicator to inform User Equipment (UE), that Tx beam will be switched; receiving the indicator by a Receiver, and preparing to switch to another Rx beam.

In Example 37, the subject matter of Example 36 optionally includes or any claim herein wherein a beam refinement reference signal (BRRS) can be utilized as an indication signal to inform UE for simultaneous beam switching.

In Example 38, the subject matter of Example undefined optionally includes or any claim, wherein the UE will receive the DCI corresponding to BRRS configuration based on the current Rx beam, and detect the BRRS format indicator within DCI; and after observing that it is a BRRS format for abrupt beam switching. UE receives the BRRS based on the Rx beams around candidate Rx beam, and obtains an optimal Rx beam for the following data reception.

In Example 39, the subject matter of Example undefined optionally includes and/or some other claim herein, wherein 1-bit beam switching indicator for synchronous beam switching can be indicated by DCI, where "1" means switching to the candidate Rx beam, and "0" for vice versa.

In Example 40, the subject matter of Example undefined optionally includes and/or some other claim herein, wherein the beam switching indicator can be configured during the DCI for CSI-RS configuration.

In Example 41, the subject matter of Example 40 optionally includes and/or some other claim herein, if the beam switching is activated, UE will measure the CSI-RS based on the candidate Rx beam, otherwise, the current Rx beam is adopted.

In Example 42, the subject matter of Example undefined optionally includes and/or some other claim herein, wherein beam switching indicator can be configured during the downlink configuration DCI or uplink grant DCI.

In Example 43, the subject matter of Example undefined optionally includes and/or some other claim herein, if the active beam switching indicator is configured at the Nth subframe. LIE will switch to the candidate Rx beam starting from the (N+Noffset)th subframe.

In Example 44, the subject matter of Example 43 optionally includes and/or some other claim herein, for Noffset=0, UE performs Rx beam switching at the current subframe after receiving the control symbols.

In Example 45, the subject matter of Example undefined optionally includes and/or some other claim herein wherein the beam switching indicator can be configured by other DCI.

In Example 46, the subject matter of Example undefined optionally includes and/or some other claim herein, wherein the subframe offset Noffset for Rx beam switching can be configured by the DCI, or higher layer signaling, such as MIB, SIB or RRC.

Example 47 is an apparatus comprising means to perform one or more elements of a method described in or related to any of method or process described herein.

Example 48 is the instructions by one or more processors of the electronic device, to perform one or more elements of a method described in or related to any of the claims described herein, or any other method or process described herein.

In Example 49, the subject matter of Example undefined optionally includes any other method or process described herein.

Example 50 is a method, technique, or process as described in or related to any claim above, or portions or parts thereof.

Example 51 is an apparatus comprising: one or more processors and one or more computer readable media comprising instructions that, when executed by the one or more processors, cause the one or more processors to perform the method, techniques, or process as described in or related to any of example, or portions thereof.

Example 52 may include a method of communicating in a wireless network as shown and described herein.

Example 53 may include a system for providing wireless communication as shown and described herein.

Example 54 may include a device for providing wireless communication as shown and described herein.

Figure 8:
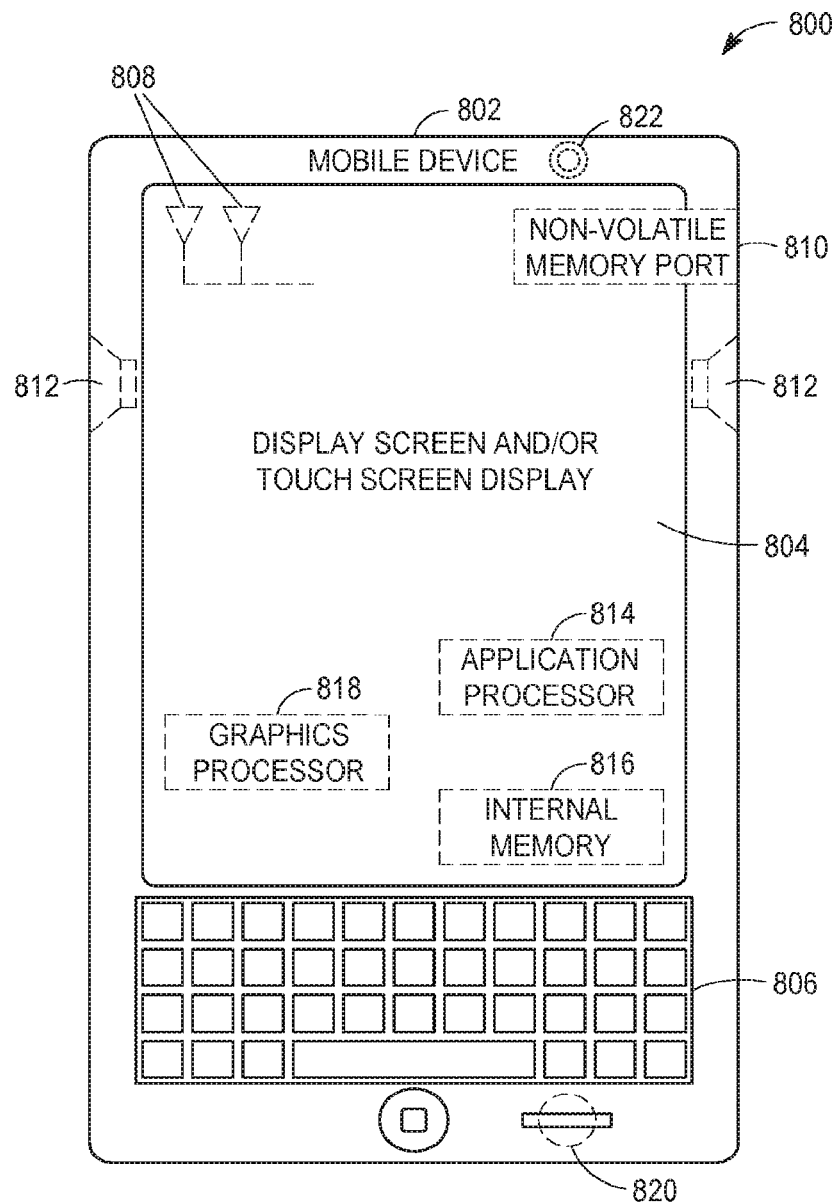
FIG. 8 illustrates aspects of a UE, in accordance with some example embodiments.

FIG. 8 shows an example UE, illustrated as a UE 800. The UE 800 may be an implementation of the UE 102, or any device described herein. The UE 800 can include one or more antennas 808 configured to communicate with a transmission station, such as a base station (BS), an eNB, or another type of wireless wide area network (WWAN) access point. The UE 800 can be configured to communicate using at least one wireless communication standard including 3GPP LTE, WiMAX, High Speed Packet Access (HSPA), Bluetooth, and WiFi. The UE 800 can communicate using separate antennas for each wireless communication standard or shared antennas for multiple wireless communication standards. The UE 800 can communicate m a WLAN, a wireless personal area network (WPAN), and/or a WWAN.

FIG. 8 also shows a microphone 820 and one or more speakers 812 that can be used for audio input and output to and from the UE 800. A display screen 804 can be a liquid crystal display (LCD) screen, or another type of display screen such as an organic light emitting diode (OLED) display. The display screen 804 can be configured as a touch screen. The touch screen can use capacitive, resistive, or another type of touch screen technology. An application processor 814 and a graphics processor 818 can be coupled to an internal memory 816 to provide processing and display capabilities. A non-volatile memory port 810 can also be used to provide data I/O options to a user. The non-volatile memory port 810 can also be used to expand the memory capabilities of the UE 800. A keyboard 806 can be integrated with the UE 800 or wirelessly connected to the UE 800 to provide additional user input. A virtual keyboard can also be provided using the touch screen. A camera 822 located on the front (display screen) side or the rear side of the UE 800 can also be integrated into a housing 802 of the UE 800.

Figure 9:
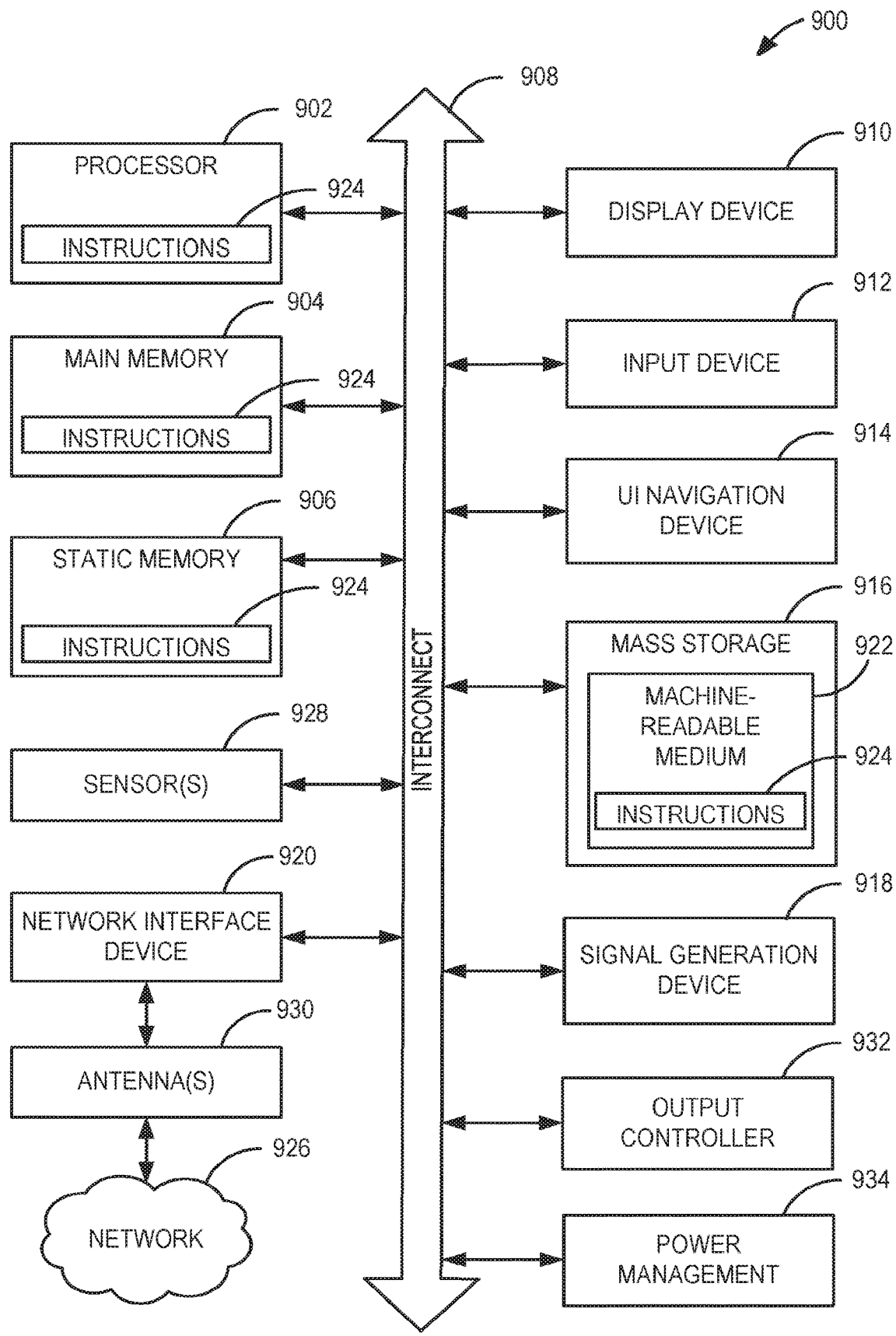
FIG. 9 is a block diagram illustrating an example computer system machine which may be used in association with various embodiments described herein.

FIG. 9 is a block diagram illustrating an example computer system machine 900 upon which any one or more of the methodologies herein discussed can be run, and which may be used to implement the eNB 104, the UE 102, or any other device described herein. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system machine 900 includes a processor 902 (e.g., a central processing unit (CPU), a graphics processing unit (GPU), or both), a main memory 904, and a static memory 906, which communicate with each other via an interconnect 908 (e.g., a link, a bus, etc.). The computer system machine 900 can further include a video display unit 910, an alphanumeric input device 912 (e.g., a keyboard), and a user interface (UI) navigation device 914 (e.g., a mouse). In one embodiment, the video display unit 910, alphanumeric input device 912, and UI navigation device 914 are a touch screen display. The computer system machine 900 can additionally include a mass storage device 916 (e.g., a drive unit), a signal generation device 918 (e.g., a speaker), an output controller 932, a power management controller 934, a network interface device 920 (which can include or operably communicate with one or more antennas 930, transceivers, or other wireless communications hardware), and one or more sensors 928, such as a GPS sensor, compass, location sensor, accelerometer, or other sensor.

The mass storage device 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904, static memory 906, and/or processor 902 during execution thereof by the computer system machine 900, with the main memory 904, the static memory 906, and the processor 902 also constituting machine-readable media.

While the machine-readable medium 922 is illustrated in an example embodiment to be a single medium, the term "machine-readable medium" can include a single medium or multiple media (e.g., a centralized or distributed database, and/or associated caches and servers) that store the one or more instructions 924. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions.

The instructions 924 can further be transmitted or received over a communications network 926 using a transmission medium via the network interface device 920 utilizing any one of a number of well-known transfer protocols (e.g., hypertext transfer protocol (HTTP)). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (i.e., instructions) embodied in tangible media, such as floppy diskettes, CD-ROMs, hard drives, non-transitory computer readable storage media, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a Random Access Memory (RAM), Erasable Programmable Read-Only Memory (EPROM), flash drive, optical drive, magnetic hard drive, or other medium for storing electronic data. The eNB and UE may also include a transceiver module, a counter module, a processing module, and/or a clock module or timer module. One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, Institute of Electrical and Electronics Engineers (IEEE) 902.11, and Bluetooth communication standards. Various alternative embodiments may use a variety of other WWAN. WLAN, and WPAN protocols and standards in connection with the techniques described herein. These standards include, but are not limited to, other standards from 3GPP (e.g., HSPA+, UMTS), IEEE 902.16 (e.g., 902.16p), or Bluetooth (e.g., Bluetooth 8.0, or like standards defined by the Bluetooth Special Interest Group) standards families. Other applicable network configurations can be included within the scope of the presently described communication networks. It will be understood that communications on such communication networks can be facilitated using any number of personal area networks (PANs), local area networks (LANs), and wide area networks (WANs), using any combination of wired or wireless transmission mediums.

Figure 10:
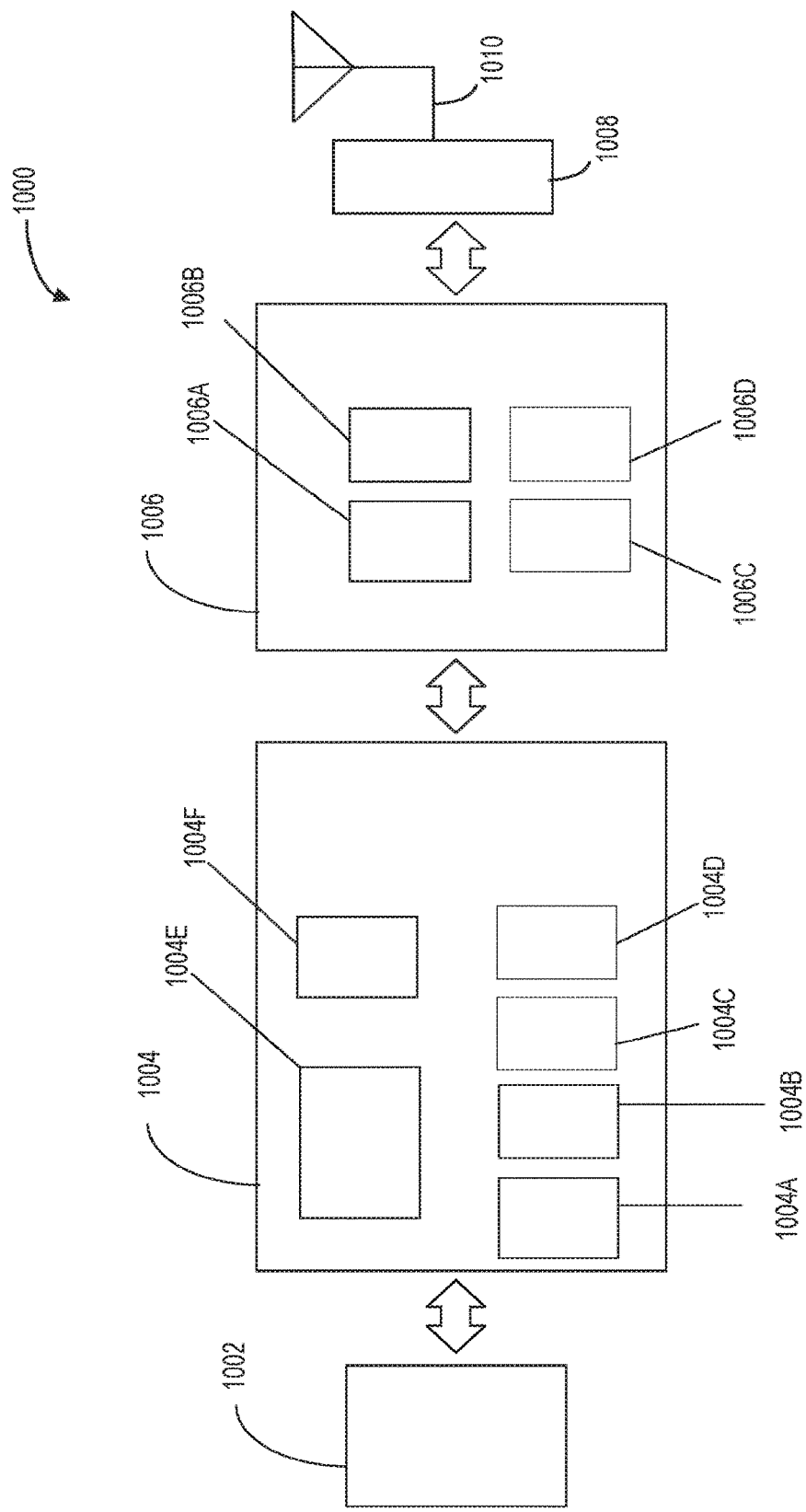
FIG. 10 illustrates aspects of a UE, in accordance with some example embodiments.

Embodiments described herein may be implemented into a system using any suitably configured hardware and/or software. FIG. 10 illustrates components of a UE 1000 in accordance with some embodiments. At least some of the components shown may be used in the UE 102 (or eNB 104) shown in FIG. 1. The UE 1000 and other components may be configured to use the synchronization signals as described herein. The UE 1000 may be one of the UEs 102 shown in FIG. 1 and may be a stationary, non-mobile device or may be a mobile device. In some embodiments, the UE 1000 may include application circuitry 1002, baseband circuitry 1004, Radio Frequency (RF) circuitry 1006, front-end module (FEM) circuitry 1008, and one or more antennas 1010, coupled together at least as shown. At least some of the baseband circuitry 1004, RF circuitry 1006, and FEM circuitry 1008 may form a transceiver. In some embodiments, other network elements, such as the eNB 104, may contain some or all of the components shown in FIG. 10. Other of the network elements, such as the MME, may contain an interface, such as the S1 interface, to communicate with the eNB over a wired connection regarding the UE 1000.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the UE 1000.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. The baseband circuitry 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004a, third generation (3G) baseband processor 1004b, fourth generation (4G) baseband processor 1004c, and/or other baseband processor(s) 1004d for other existing generations, generations in development, or generations to be developed in the future (e.g., fifth generation (5G), etc.). The baseband circuitry 1004 (e.g., one or more of the baseband processors 1004a-d) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include FFT, preceding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004e of the baseband circuitry 1004 may be configured to run elements of the protocol stack for signaling of the PHY, MAC, RLC, PDCP, and/or RRC layers. In some embodiments, the baseband circuitry 1004 may include one or more audio digital signal processor(s) (DSPs) 1004f. The audio DSP(s) 1004f may be or include elements for compression/decompression and echo cancellation and may include other suitable processing elements in other embodiments. Components of the baseband circuitry 1004 may be suitably combined in a single chip or a single chipset, or disposed on a same circuit board in some embodiments. In some embodiments, some or all of the constituent components of the baseband circuitry 1004 and the application circuitry 1002 may be implemented together, such as, for example, on a system on a chip (SOC).

In some embodiments, the baseband circuitry 1004 may provide for communication compatible with one or more radio technologies. For example, in some embodiments, the baseband circuitry 1004 may support communication with an EUTRAN and/or other wireless metropolitan area networks (WMAN), a WLAN, or a WPAN. Embodiments in which the baseband circuitry 1004 is configured to support radio communications of more than one wireless protocol may be referred to as multi-mode baseband circuitry. In some embodiments, the UE 1000 can be configured to operate in accordance with communication standards or other protocols or standards, including Institute of Electrical and Electronic Engineers (IEEE) 802.16 wireless technology (WiMax). IEEE 802.11 wireless technology (WiFi) including IEEE 802.11 ad, which operates in the 60 GHz millimeter wave spectrum, or various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

The RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. The RF circuitry 1006 may include a receive signal path which may include circuitry to down-convert RF signals received from the FEM circuitry 1008 and provide baseband signals to the baseband circuitry 1004. The RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006a, amplifier circuitry 1006b, and filter circuitry 1006c. The transmit signal path of the RF circuitry 1006 may include the filter circuitry 1006c and the mixer circuitry 1006a. The RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by the synthesizer circuitry 1006d. The amplifier circuitry 1006b may be configured to amplify the down-converted signals, and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, the mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by the filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature downconversion and/or upconversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a of the transmit signal path may be arranged for direct downconversion and/or direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect, as other types of frequency synthesizers may be suitable. For example, the synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the application circuitry 1002 depending on the desired output frequency. In some embodiments, a divider control input (e.g., N) may be determined from a look-up table based on a channel indicated by the application circuitry 1002.

The synthesizer circuitry 1006d of the RF circuitry 1006 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1006 may include an IQ/polar converter.

The FEM circuitry 1008 may include a receive signal path which may include circuitry configured to operate on RF signals received from the one or more antennas 1010, amplify the received signals, and provide the amplified versions of the received signals to the RF circuitry 1006 for further processing. The FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a Tx/Rx switch to switch between transmit mode and receive mode operation. The FEM circuitry 1008 may include a receive signal path and a transmit signal path. The receive signal path of the FEM circuitry 1008 may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by the RF circuitry 1006), and one or more filters to generate RF signals for subsequent transmission (e.g., by one or more of the one or more antennas 1010).

In some embodiments, the UE 1000 may include additional elements such as, for example, a memory/storage, display, camera, sensor, and/or input/output (I/O) interface as described in more detail below. In some embodiments, the UE 1000 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly. In some embodiments, the UE 1000 may include one or more user interfaces designed to enable user interaction with the system and/or peripheral component interfaces designed to enable peripheral component interaction with the system. For example, the UE 1000 may include one or more of a keyboard, a keypad, a to touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 1010 may comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 1010 may be effectively separated to take advantage of spatial diversity and the different channel characteristics that may result.

Although the UE 1000 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of to one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

While the communication device-readable medium is illustrated as a single medium, the term "communication device-readable medium" may include a single medium or multiple media (e.g., a centralized or distributed database, and/or associated caches and servers) configured to store the one or more instructions.

The term "communication device-readable medium" may include any medium that is capable of storing, encoding, or carrying instructions for execution by the communication device and that cause the communication device to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., EPROM. Electrically Erasable Programmable Read-Only Memory (EEPROM)) and flash memory devices; magnetic disks, such as internal hard disks and removable disks; magneto-optical disks: RAM: and CD-ROM and DVD-ROM disks. In some examples, communication device-readable media may include non-transitory communication device-readable media. In some examples, communication device-readable media may include communication device-readable media that is not a transitory propagating signal.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP), hypertext transfer protocol (HTTP), etc.). Example communication networks may include a LAN, a WAN, a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, a Long Term Evolution (LTE) family of standards, a Universal Mobile Telecommunications System (UMTS) family of standards, or peer-to-peer (P2P) networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using single-input multiple-output (SIMO), MIMO, or multiple-input single-output (MISO) techniques. In some examples, the network interface device may wirelessly communicate using Multiple User MIMO techniques. The term "transmission medium" shall be taken to include any intangible medium that is capable of storing, encoding, or carrying instructions for execution by the communication device, and includes digital or analog communications signals or other intangible media to facilitate communication of such software.

As discussed above, an eNB may have multiple antennas that may be used in various groupings and with various signal modifications for each grouping to produce a plurality of APs. Each AP may be defined for one or more antennas. Each AP may correspond to a different transmission signal direction. Using the different APs, the eNB may transmit multiple layers with codebook-based or non-codebook-based precoding techniques. Each AP may correspond to a beam that transmits AP-specific CSI-RS signals. The UE may contain a plurality of receive antennas that may be used selectively to create Rx beamforming. Rx beamforming may be used to increase the receive antenna (beamforming) gain for the direction(s) on which desired signals are received, and to suppress interference from neighboring cells. Fast Rx beam refinement, in which the Rx beam direction is dynamically adjusted in response to the channel conditions measured by the UE, is desirable from a performance standpoint.

This may be particularly desirable with use of the high-frequency bands around, for example, 28 GHz, 37 GHz, 39 GHz, and 64-71 GHz, used in conjunction with carrier aggregation, which may permit networks to continue to service the never-ending hunger for data delivery. The increased beamforming gain in this frequency range may permit the UE and eNB to compensate for the increasingly likely event of severe pathloss and suppress mutual user interference, leading to an increase in system capacity and coverage.

To maximize the beamforming gain, as indicated above, the UE may search for an optimum Tx/Rx beam pair using the BRS. However, the BRS is a broadcast signal that is transmitted periodically on all Tx beams in a fixed manner. This means that to detect the BRS, the UE may have to wait until the next BRS subframe for Rx beam refinement if the UE has just missed the BRS. This, however, may not be fast enough in some circumstances. In addition to or instead of using the BRS, the CSI-RS or Sounding RS (SRS) also can be utilized for Rx beam refinement. In this case, however, the Tx beams on the RS used are limited to the most recent reported BRS measurement. Thus, a BRRS may be to produced for transmission on the same Tx beam as data to be transmitted to the UE.

In some embodiments, to achieve faster Rx beam refinement and update the Rx beam, a BRRS may be transmitted on the same Tx beam as data to be transmitted to the UE. The BRRS, along with the temporal proximity relative to the data OFDM symbols (e.g., within 6, 13, or 25 ms), establishes an association between the BRRS and the data on the same Tx beam. Multiple BRRS symbols may be transmitted using the same Tx beam. Such Rx-beam refinement may enable the UE and eNB to use the selected beam to communicate more effectively. However, not all UEs may use BRRS symbols. This may result in the BRRS symbols of one set of UEs and the data symbols of another set of UEs causing mutual interference with each other. To avoid the interference, BRRS symbol mapping and a specific BRRS format may be used.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), RAM, magnetic disk storage media, optical storage media, flash-memory devices, and other storage devices and media. Some embodiments may include one or more processors and may be configured with instructions stored on a computer-readable storage device.

Although an embodiment has been described with reference to specific example embodiments, it will be evident that various modifications and changes may be made to these embodiments without departing from the broader scope of the present disclosure. Accordingly, the specification and drawings arc to be regarded in an illustrative rather than a restrictive sense. The accompanying drawings that form a part hereof show, by way of illustration, and not of limitation, specific embodiments in which the subject matter may be to practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiments" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended: that is, a system, UE, article, composition, formulation, or process that includes elements in addition to those listed after such a term in a claim are still deemed to fall within the scope of that claim. Moreover, in the following claims, the terms "first," "second," and "third." etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of a user equipment (UE), the apparatus comprising:
    a memory; and
    processing circuitry in communication with the memory and arranged to:
    decode a downlink control information (DCI) received in a physical downlink control channel (PDCCH) from a base station that includes an indication that a transmission (Tx) beam is to switch to an updated Tx beam;
    wherein in response to the DCI, the processing circuitry is to initiate switching from a receive (Rx) beam to an updated Rx beam to match the updated Tx beam; and
    receive a data transmission associated with the updated Tx beam using the updated Rx beam.

2. The apparatus of claim 1, wherein the processing circuitry initiates switching from the Rx beam to the updated Rx beam to match the updated Tx beam at a non-zero time offset relative to receiving the DCI.

3. The apparatus of claim 1, wherein the indication comprises a beam refinement reference signal (BRRS) format indicator within the DCI.

4. The apparatus of claim 3, wherein said switching from the RX beam to the updated Rx beam to match the updated Tx beam is performed based on identifying that the BRRS format indicator indicates abrupt beam switching.

5. The apparatus of claim 1, wherein the processing circuitry is further configured to:
    receive a channel state information reference signal (CSI-RS) on the updated TX beam prior to receiving the data transmission.

6. The apparatus of claim 5, wherein said switching from the RX beam to the updated Rx beam to match the updated Tx beam is based on measurements of the CSI-RS.

7. The apparatus of claim 1, wherein the processing circuitry is further configured to select the updated Rx beam from a set of candidate Rx beams.

8. A base station, comprising:
    a radio;
    a memory; and
    processing circuitry in communication with the memory and the radio and arranged to:
    transmit a downlink control information (DCI) received in a physical downlink control channel (PDCCH) to a user equipment (UE) device that includes an indication that a transmission (Tx) beam is to switch to an updated Tx beam;

wherein the DCI indicates for the UE to initiate switching from a receive (Rx) beam to an updated Rx beam to match the updated Tx beam; and transmit a data transmission associated with the updated Tx beam.

9. The base station of claim 8, wherein the DCI indicates for the UE to initiate said switching from Rx beam to the updated Rx beam to match the updated Tx beam at a non-zero time offset relative to the UE receiving the DCI.

10. The base station of claim 9, wherein the indication comprises a beam refinement reference signal (BRRS) format indicator within the DCI.

11. The base station of claim 10, wherein said switching from the RX beam to the updated Rx beam to match the updated Tx beam is based on identifying that the BRRS format indicator indicates abrupt beam switching.

12. The base station of claim 8, wherein the processing circuitry is further configured to:

transmit a channel state information reference signal (CSI-RS) on the updated TX beam prior to transmitting the data transmission.

13. The base station of claim 12, wherein said switching from the RX beam to the updated Rx beam to match the updated Tx beam is performed based on measurements of the CSI-RS.

14. The base station of claim 13, wherein the processing circuitry is further configured to transmit radio resource control (RRC) signaling to the UE to configure the updated TX beam for the CSI-RS.

15. A method for operating a user equipment (UE) device, the method comprising:

decoding a downlink control information (DCI) in a physical downlink control channel (PDCCH) received from a base station that includes an indication that a transmission (Tx) beam is to switch to an updated Tx beam;

in response to the DCI, initiating switching from a receive (Rx) beam to an updated Rx beam to match the updated Tx beam; and receiving a data transmission associated with the updated Tx beam using the updated Rx beam.

16. The method of claim 15, wherein initiating switching from the Rx beam to the updated Rx beam to match the updated Tx beam is performed at a non-zero time offset relative to receiving the DCI.

17. The method of claim 15, wherein the indication is a beam refinement reference signal (BRRS) format indicator within the DCI, and wherein said switching from the RX beam to the updated Rx beam to match the updated Tx beam is performed based on identifying that the BRRS format indicator indicates abrupt beam switching.

18. The method of claim 15, the method further comprising:

receiving a channel state information reference signal (CSI-RS) on the updated TX beam prior to receiving the data transmission.

19. The method of claim 18, wherein said switching from the RX beam to the updated Rx beam to match the updated Tx beam is performed based on measurements of the CSI-RS.

20. The method of claim 19, the method further comprising receiving radio resource control (RRC) signaling to configure the updated TX beam for the CSI-RS.

* * * * *